United States Patent [19]
Michehl

[11] Patent Number: 5,755,177
[45] Date of Patent: May 26, 1998

[54] SALT BLOCK INSERT

[76] Inventor: Lee A. Michehl, P.O. Box 693, Purcellville, Va. 22132

[21] Appl. No.: 579,442

[22] Filed: Dec. 27, 1995

[51] Int. Cl.[6] .................................. A23K 1/16; A01K 5/15
[52] U.S. Cl. .................................................. 119/51.03
[58] Field of Search ................................... 119/51.03, 61, 119/657

[56] References Cited

U.S. PATENT DOCUMENTS

| | | | |
|---|---|---|---|
| 528,871 | 11/1894 | Greer | 119/61 |
| 811,592 | 2/1906 | Stoneburner et al. | 119/61 |
| 842,836 | 1/1907 | Hutcheson | 119/51.03 |
| 960,367 | 6/1910 | Miller | 119/61 |
| 1,786,777 | 12/1930 | Pfeiffer | 119/51.03 |
| 2,267,062 | 12/1941 | Walter et al. | 119/51.03 |
| 2,664,856 | 1/1954 | Ferris | 119/51.03 |
| 2,801,609 | 8/1957 | Webster | 119/51.03 |
| 3,924,573 | 12/1975 | Thomas et al. | 119/61 |
| 5,560,315 | 10/1996 | Lampe | 119/61 X |

*Primary Examiner*—Robert P. Swiatek
*Assistant Examiner*—Elizabeth Shaw
*Attorney, Agent, or Firm*—Gary Pisner

[57] ABSTRACT

A salt block insert for animals which consists of a salt block reservoir that is inserted into or attached to the inside of a feed container. The salt block insert permits the intake of required food and minerals at the same time, and also prevents the salt block from being removed from the feed container.

3 Claims, 11 Drawing Sheets

SALT BLOCK INSERT

BACKGROUND

1. Field of Invention

This invention relates to a mineral/salt block holder that is either inserted in, attached to, or integrated into animal fed containers of various geometric shapes.

2. Description of Related Art

Herbivorous Animals require salt in their diet. Salt blocks are used to supply salt and minerals to many herbivorous domesticated animals. In a barn, the salt blocks are mounted in frames in stalls or walls. A number of frames have been invented for holding a salt block. For example, Ferris U.S. Pat. No. 2,664,856 shows a salt block container that is a frame, which holds a salt block, that is secured adjacent to a cow stall. Other salt block containers consist mainly of trays that attach to the wall or stall. Unlike existing salt block containers, the present invention permits the herbivorous animal to receive its food and minerals at the same time in the same container. This reduces the chance of a herbivore failing to get its daily intake of minerals, and permits the use of a single container for both feed and mineral intake. It is therefore the object of this invention to provide a device that will permit feeding and mineral intake from a single container. It is a further object of this invention to snugly hold the three common sizes of salt blocks to prevent their removal from the holder by the domesticated animal. At this time there are no devices available that permit both feeding and mineral intake at the same time, nor are there any salt block holders that are capable of snugly holding the three main inside block sizes.

SUMMARY OF THE INVENTION

A salt block holder designed to be integrated into a conventional animal feed container. This invention is designed to fit inside or molded directly into the three main types of animal feed containers, a round type, a corner type, and a rectangular/square type of feed container. The actual salt block container can be either a recessed or stand alone salt block reservoir that is terraced to accept the three main sizes of salt blocks. The salt blocks are held in place by flexible flanges. This salt block container can either be mounted on a mounting base that fits on the bottom of the feed containers, bolted onto the bottom of the food container, integrated into a shelf assembly that is inserted into the feed container, molded into the bottom of a feed container, or integrated into a false bottom that is inserted or attached to the bottom of the food containers.

DETAILED DESCRIPTION OF THE PREFERRED EMBODIMENT

Figure 1A:
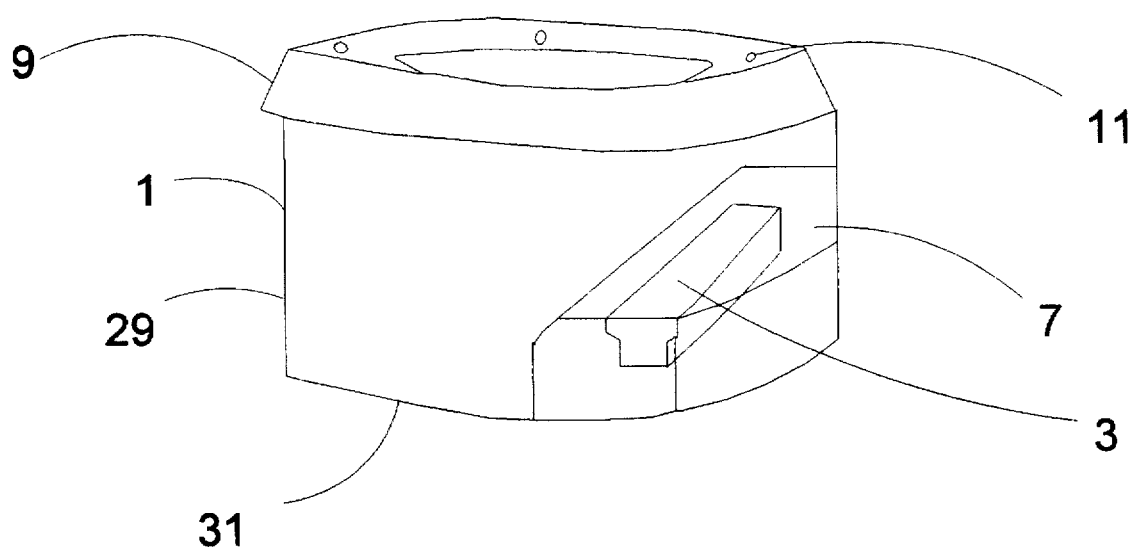
FIG. 1A is an isometric view of the round feed container with a shelf insert and salt block reservoir.
Figure 1B:
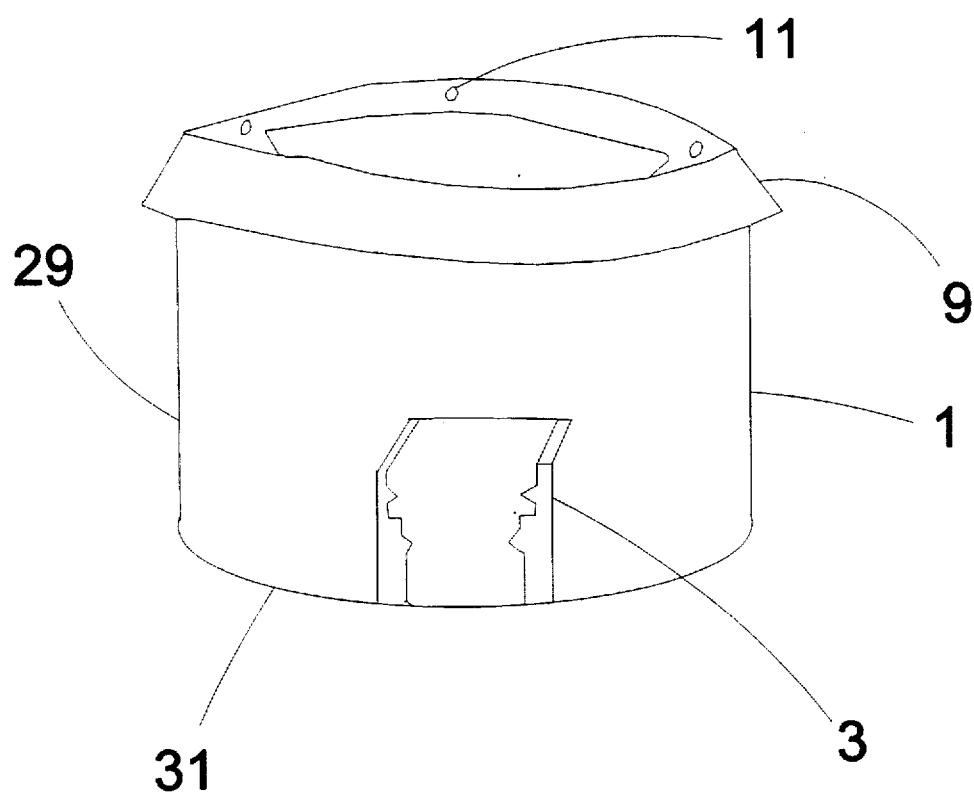
FIG. 1B is an isometric view of the round feed container with a free standing salt block reservoir attached to the feed container bottom.
Figure 1C:
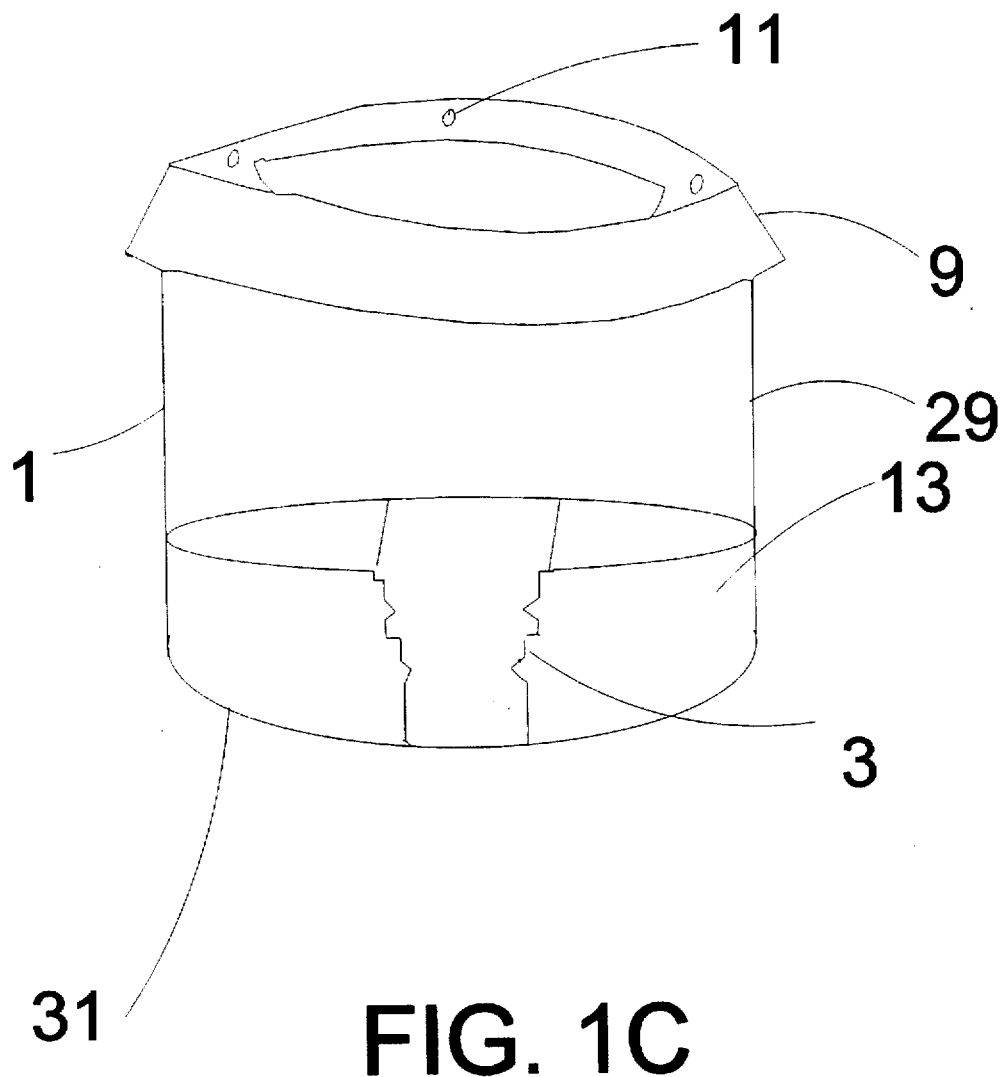
FIG. 1C is an isometric view of the round feed container with a salt block reservoir integrated into a false bottom.
Figure 2:
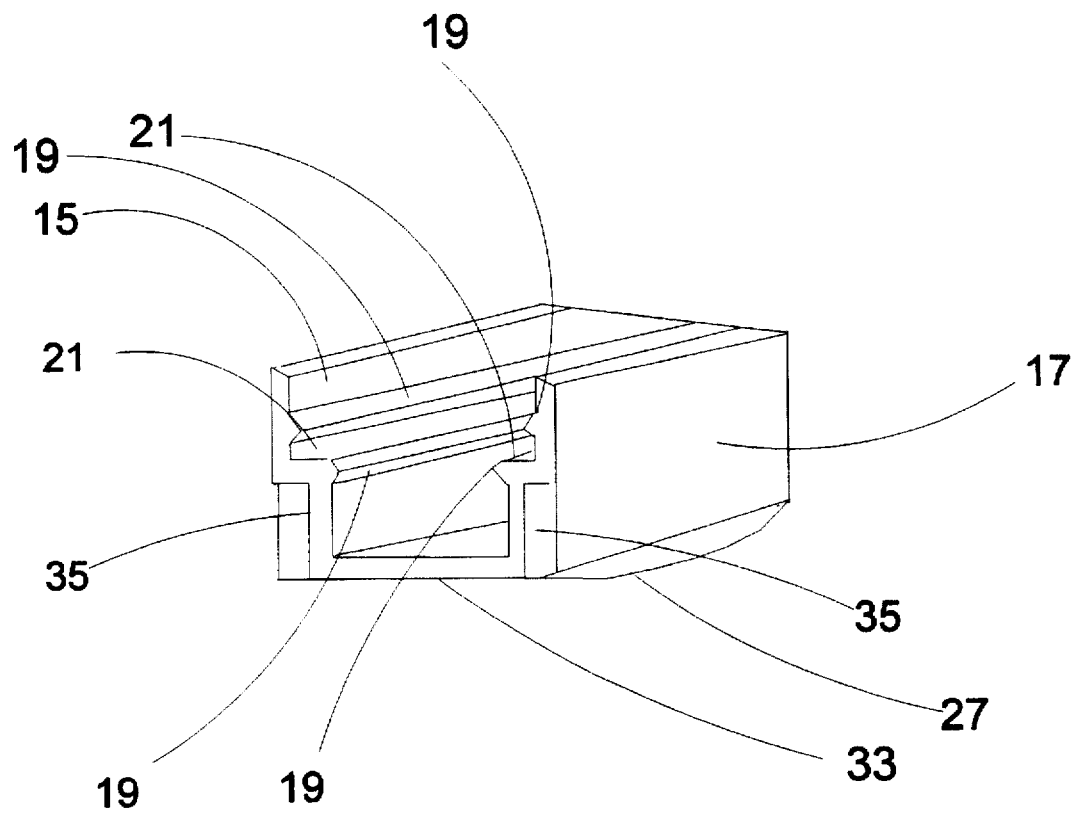
FIG. 2 is an isometric view of a cross-section of a salt block reservoir.
Figure 3A:
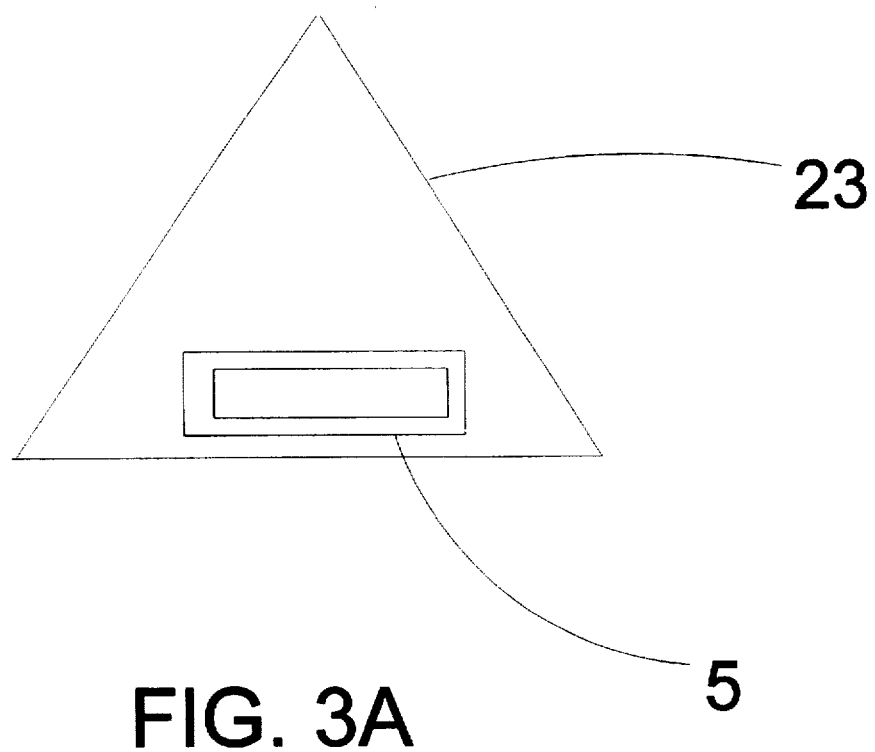
FIG. 3A is a top view of a corner type feeder with a free standing salt block reservoir attached to feed container bottom.
Figure 3B:
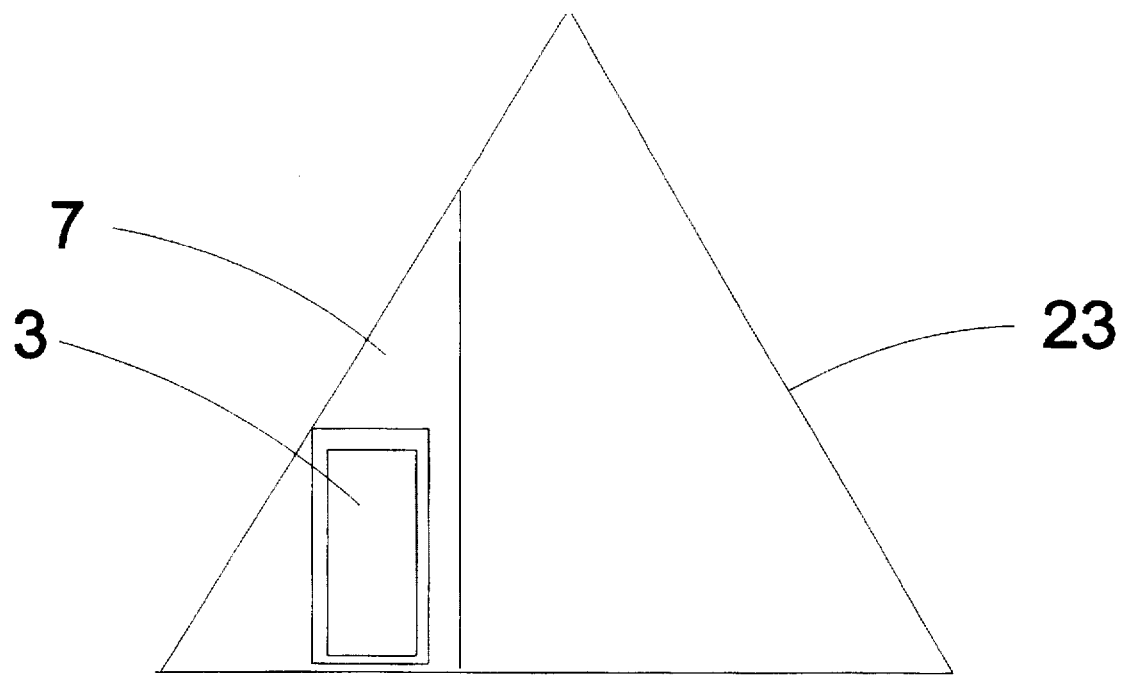
FIG. 3B is a top view of a corner type feeder with a shelf insert with a salt block reservoir.
Figure 4A:
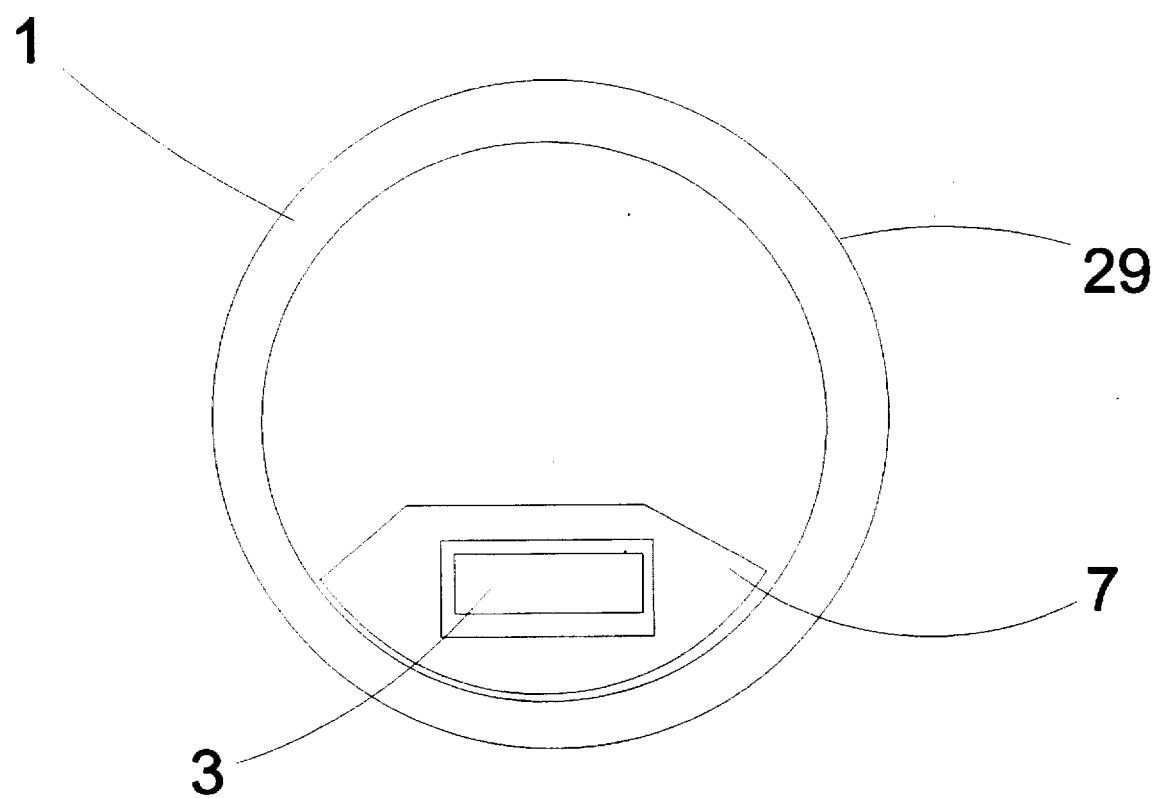
FIGS. 4A and 4B are top views of two different embodiments of a round feed container with a shelf insert and salt block reservoirs.
Figure 4B:
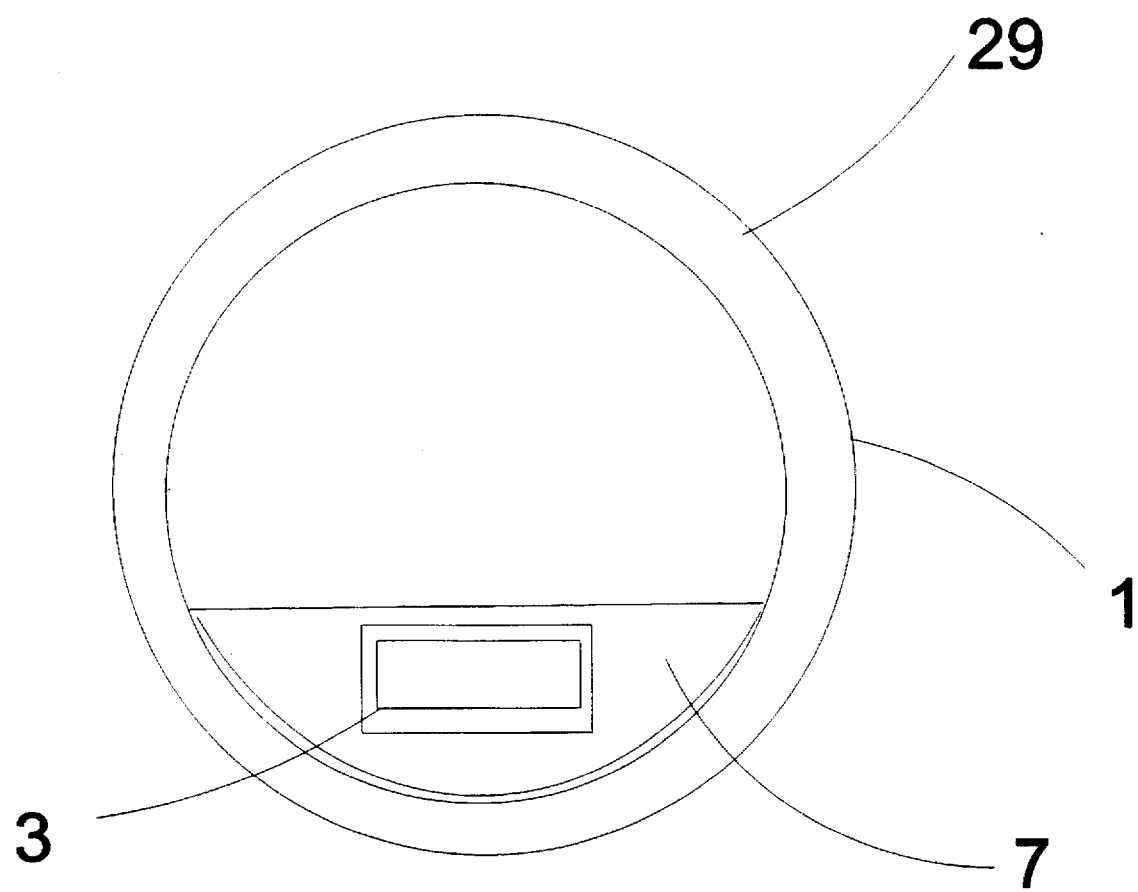
Figure 5A:
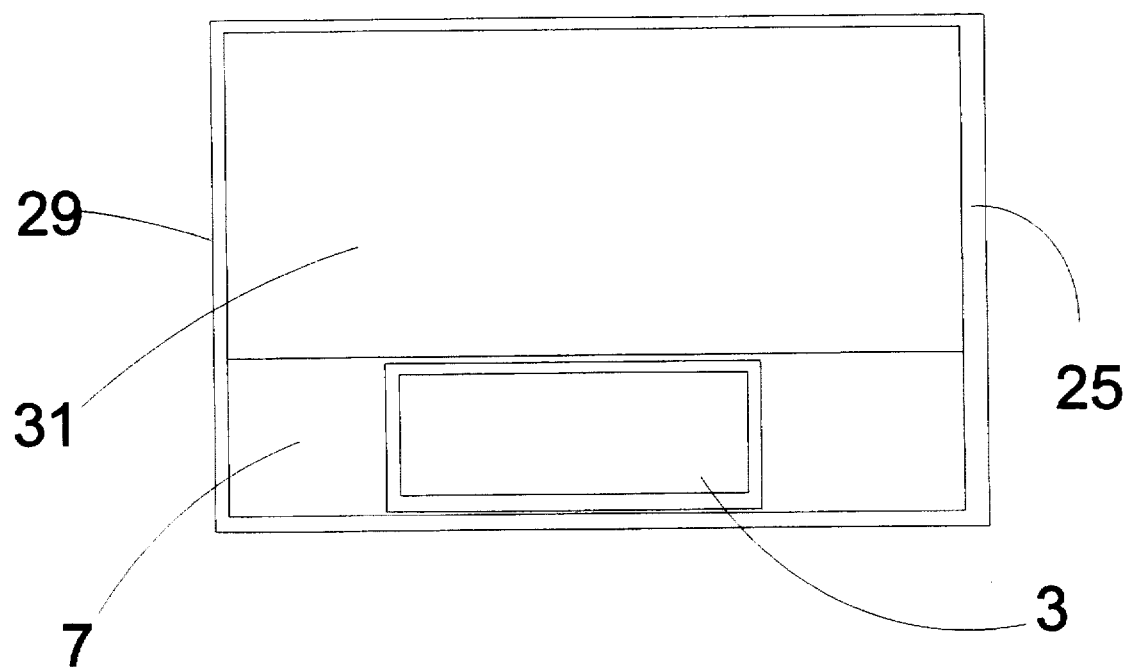
FIG. 5A is a top view of a rectangular/square feed container with a shelf attached to the feed container bottom.
Figure 5B:
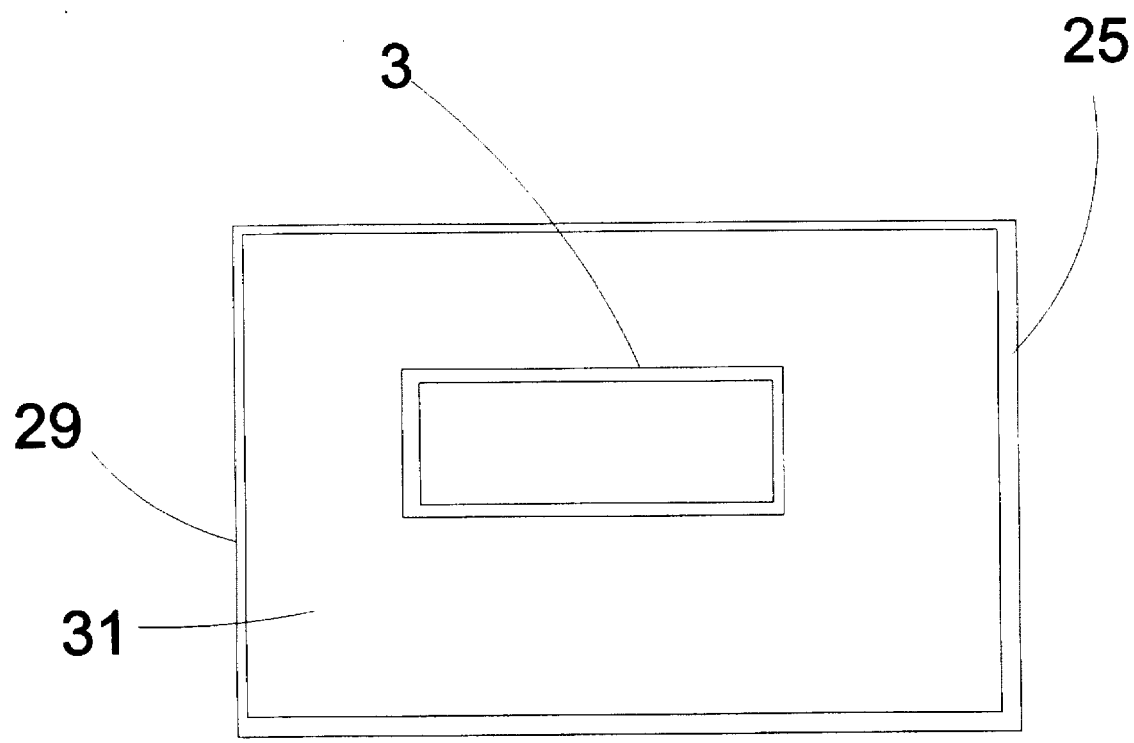
FIG. 5B is a top view of a rectangular/square feed container with a free standing salt block reservoir attached to the feed container bottom.
Figure 6:
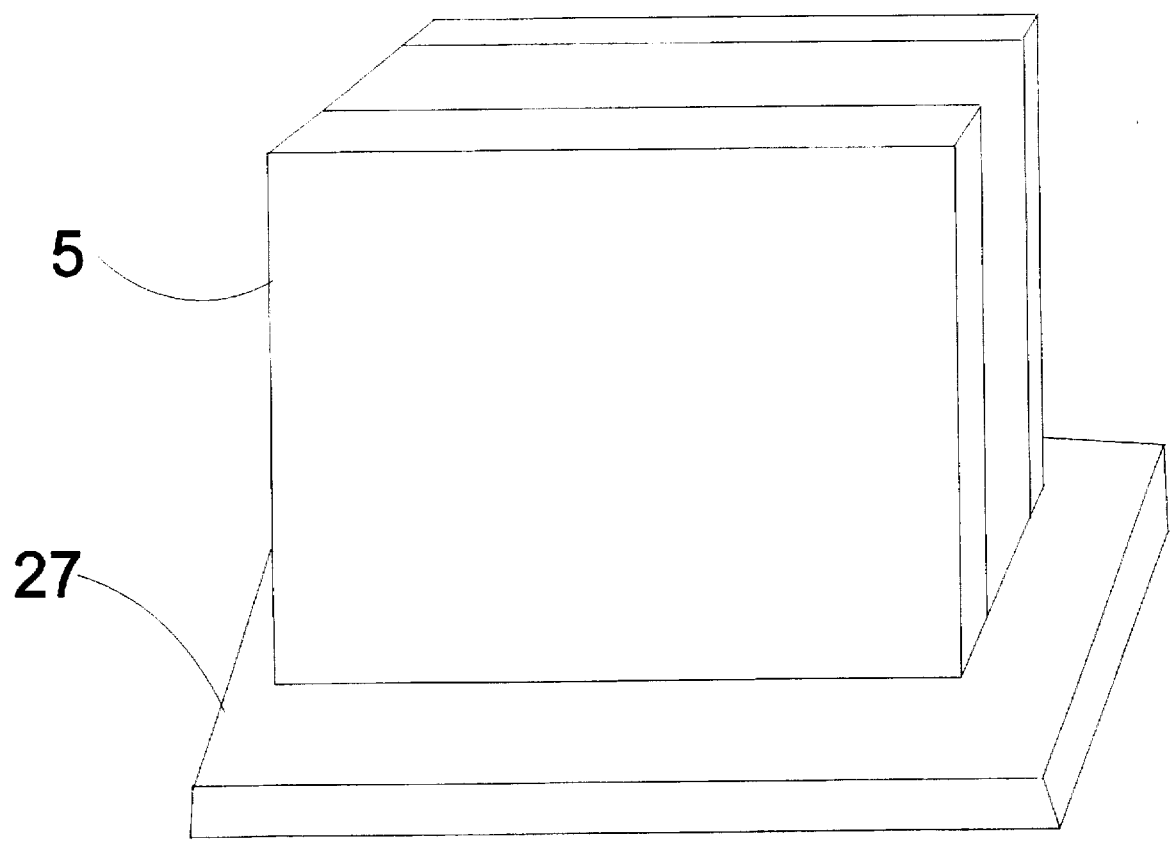
FIG. 6 is an isometric view of a free standing salt block reservoir mounted on a mounting base for a rectangular/square feed container.

FIGS. 1A, 1B, and 1C and FIGS. 4A, 4B, and 4C show side views, and top views respectively of the invention in a round feed container 1. FIGS. 3A and 3B show a top view of the invention used in a corner type feeder 23. FIG. 5A and 5B show a top view of the invention used in a rectangular/square type of feeder 25. The three major types of feeder containers consist of a feed container bottom 31, and a feed container wall 29. Feed containers can also have a detachable ring 9 with holes for a ring/snap assembly 11 for mounting the feed container on a wall to prevent food spillage (see FIGS. 1A, 1B, and 1C). The actual salt block reservoir can be a recessed salt block reservoir 3 integrated into a shelf 7, (see FIGS. 1A, 3B, 4A, 4B, and 5A), or the recessed salt block reservoir can be integrated into a feed container false bottom 13 (see FIG. 1C). The salt block reservoir can also be a free standing reservoir 5 as in FIGS. 1B, 3A, 5B, and 6. The salt block reservoir itself in FIG. 2 consists of a salt block reservoir bottom 33, bottom inner retaining walls 35 spaced approximately 82 mm apart for thinner salt blocks, and outer retaining wall surfaces. The salt block reservoir is terraced to permit the insertion of wider standard sized salt blocks. This terracing creates mezzanine shelves 21 that serve as the base for wider salt blocks. Upper retaining walls 15 are spaced approximately 104 mm apart to accommodate the wider standard salt block width. All salt blocks are held in place by flexible flanges 19 mounted on the surface of the bottom inner retaining wall 35 and the top inner retaining wall 15. The preferred embodiment of this invention is made of plastic, and is molded into the feed container bottom. The invention can also be inserted into the feed container using a mounting base 27 (see FIG. 6) that covers the entire feed container bottom 31.

Accordingly, the reader will see that the present invention can be used to permit the simultaneous intake of food and minerals using a single feeder. This invention is also simple to install, simple to manufacture, effective in securing a salt block.

Although the description above contains many specificities, these should not be construed as limiting the scope of the invention but as merely providing illustrations of some of the presently preferred embodiments of this invention. For example, although preferred embodiment of this invention is made of plastic, this invention could be made of almost any type of non corrosive material or coated corrosive material including sheet metal, cast metal, and ceramic material. Also, although the preferred embodiment of this invention is to have the invention molded into a feed container, it can also be placed at bottom of the feed container and held in place by a mounting base 27 that covers the bottom of the feed container, the invention could be bolted, riveted, soldered, welded, glued, fused to the feed container bottom 31 and/or to the feed container wall 29. In addition, a non-enumerated feed container geometry can be used with this invention. Finally, although the preferred embodiment of this invention has a terraced salt block reservoir to hold different sized blocks, this invention will also work with other configurations such as a single level block holder that will work with only one size of salt block.

Thus the scope of the invention should be determined by the appended claims and their legal equivalents, rather than by the examples given.

I claim:

1. A salt block insert that mount inside a feed container, comprises:

a. a salt block reservoir terraced to permit multiple widths of salt blocks;

b. a mounting means for attaching said salt block reservoir to the bottom of said feed container.

2. A salt block insert that mounts inside a feed container comprising:

a. a salt block insert, comprising of a salt block reservoir integrated into a shelf.

3. A salt block insert that mounts inside a feed container, comprising:

a. a salt block insert, comprising of a salt block reservoir integrated into a false bottom.

\* \* \* \* \*